(12) United States Patent
Choi et al.

(10) Patent No.: US 8,120,729 B2
(45) Date of Patent: Feb. 21, 2012

(54) OPTICAL FILM AND METHOD OF MANUFACTURING THE SAME

(75) Inventors: Jeong-Min Choi, Daejeon Metropolitan (KR); Kyung-Sik Kim, Daejeon Metropolitan (KR); Min-Hee Lee, Daejeon Metropolitan (KR); Jun-Geun Um, Suwon-si (KR); Sang-Min Kwak, Daejeon Metropolitan (KR)

(73) Assignee: LG Chem, Ltd., Seoul (KR)

( * ) Notice: Subject to any disclaimer, the term of this patent is extended or adjusted under 35 U.S.C. 154(b) by 229 days.

(21) Appl. No.: 12/515,671

(22) PCT Filed: Nov. 20, 2007

(86) PCT No.: PCT/KR2007/005827
§ 371 (c)(1),
(2), (4) Date: May 20, 2009

(87) PCT Pub. No.: WO2008/062986
PCT Pub. Date: May 29, 2008

(65) Prior Publication Data
US 2010/0073607 A1    Mar. 25, 2010

(30) Foreign Application Priority Data

Nov. 20, 2006 (KR) .......................... 10-2006-0114493
Dec. 6, 2006 (KR) .......................... 10-2006-0122893

(51) Int. Cl.
*G02F 1/1335* (2006.01)
(52) U.S. Cl. .............. 349/96; 349/56; 349/84; 349/102; 349/117; 349/118
(58) Field of Classification Search .................... 349/56, 349/84, 96, 117, 102, 118, 141
See application file for complete search history.

(56) References Cited

U.S. PATENT DOCUMENTS

| | | | |
|---|---|---|---|
| 5,658,505 A | 8/1997 | Shimizu et al. | |
| 5,888,634 A | 3/1999 | Shimizu et al. | |
| 7,130,007 B2 * | 10/2006 | Hata et al. ..................... | 349/118 |
| 2004/0047056 A1 | 3/2004 | Sekiguchi et al. | |
| 2006/0028601 A1 | 2/2006 | Kawahara et al. | |
| 2006/0159888 A1 | 7/2006 | Hebrink et al. | |
| 2008/0018831 A1 | 1/2008 | Yano et al. | |
| 2008/0069973 A1 | 3/2008 | Nitta et al. | |
| 2009/0209705 A1 | 8/2009 | Okaniwa et al. | |

FOREIGN PATENT DOCUMENTS

| | | |
|---|---|---|
| CN | 1462372 A | 12/2003 |
| JP | 242406 A | 2/1990 |
| JP | 2191904 A | 7/1990 |
| JP | 08062422 A | 3/1996 |
| JP | 09-218307 | 8/1997 |
| JP | 2001-272537 A | 10/2001 |
| JP | 2005017435 A | 1/2005 |
| JP | 2006-124628 A | 5/2006 |
| JP | 2006126770 A | 5/2006 |
| JP | 2006208925 A | 8/2006 |
| JP | 2006-285136 A | 10/2006 |
| KR | 1020040002400 A | 1/2004 |
| KR | 1020060045914 A | 5/2006 |
| WO | 2006/030797 A1 | 3/2006 |

OTHER PUBLICATIONS

Office Action dated Mar. 30, 2010, issued by Korean Patent Office in corresponding Korean patent application No. 10-2006-0122893, 3 pages.
Office Action issued in Japanese Patent Application No. 2009-538323 on Nov. 22, 2011, 4 pages.

\* cited by examiner

*Primary Examiner* — Jennifer Doan
(74) *Attorney, Agent, or Firm* — Rothwell, Figg, Ernst & Manbeck, P.C.

(57) ABSTRACT

Disclosed is an optical film that is manufactured by using longitudinal and uniaxial stretching of an unstretched cycloolefin copolymer film and has an in-plane retardation of 100 to 150 nm and a thickness retardation of 0 to −30 nm at a wavelength of 550 nm, a polarizing plate and a liquid crystal display including the same, and a method of manufacturing the optical film. The method includes longitudinally and uniaxially stretching the unstretched film while a ratio of a width to a length of a stretched portion of the film is controlled.

19 Claims, No Drawings

OPTICAL FILM AND METHOD OF MANUFACTURING THE SAME

CROSS REFERENCE TO RELATED APPLICATIONS

This application is a 35 U.S.C. §371 National Phase Entry Application from PCT/KR2007/005827, filed Nov. 20, 2007, and designating the United States.

TECHNICAL FIELD

The present invention relates to an optical film, a method of manufacturing the optical film, and a polarizing plate and a liquid crystal display including the optical film.

This application claims priority from Korean Patent Application No. 10-2006-0114493 filed on Nov. 20, 2006 and No. 10-2006-0122893 filed on Dec. 6, 2006 in the KIPO, the disclosure of which is incorporated herein by reference in its entirety.

BACKGROUND ART

Recently, liquid crystal displays have been frequently used as display devices of computers, word processors, and small televisions. In particular, a STN liquid crystal display type has lately been put to practical use, and white STN displays and color STN displays have been noticed.

However, a liquid crystal display is readily colored to have a blue or yellow color due to a correlation of a birefringence index of a liquid crystal cell with visible rays. In the liquid crystal displays of the white STN displays and the color STN displays, coloration of the liquid crystal cell due to retardation may be reduced by adding a retardation film having a predetermined retardation to a substrate surface of the liquid crystal cell.

Stretched TAC (triacetyl cellulose) or cycloolefin polymer (COP) (for example, ZEONOR manufactured by ZEON Corp. and ARTON manufactured by JSR Corp.) has been used as the retardation film. For example, Japanese Patent Application Publication Nos. 2-191904 and 2-42406 discloses longitudinal and uniaxial stretching or transverse and uniaxial stretching of thermosetting resin films.

Meanwhile, among current liquid crystal displays that are suggested to improve a wide viewing angle, an in-plane switching liquid crystal display (IPS-LCD) includes liquid crystal molecules that are uniformly aligned almost parallel to a substrate surface in a non-operation state. Therefore, in the in-plane switching liquid crystal display, light is not affected by a polarizing plate and thus penetrates a liquid crystal layer without any changing. Thus, alignment of the polarizing plates on the upper and the lower surfaces of the substrate can give almost perfect darkness in a non-operation state. In the in-plane switching liquid crystal display, an optical compensation film is used to improve a viewing angle characteristic.

DISCLOSURE OF INVENTION

Technical Problem

It is an object of the present invention to provide a low-priced optical film that has a retardation required in the optical film of an in-plane switching (IPS) liquid crystal display and is easily purchased, and a polarizing plate and a liquid crystal display including the same.

It is another object of the present invention to provide a method of manufacturing an optical film, which includes controlling in-plane and thickness retardations and in-plane and thickness retardation variation during longitudinal and uniaxial stretching of an unstretched film.

Technical Solution

The present invention provides an optical film that is manufactured by using longitudinal and uniaxial stretching of an unstretched cycloolefin copolymer film and has an in-plane retardation of 100 to 150 nm and a thickness retardation of 0 to −30 nm at a wavelength of 550 nm.

Furthermore, the present invention provides a layered optical film that includes a) a +C-plate, and b) an optical film that is disposed on the +C-plate, manufactured by using longitudinal and uniaxial stretching of an unstretched cycloolefin copolymer film, and has an in-plane retardation of 100 to 150 nm and a thickness retardation of 0 to −30 nm at a wavelength of 550 nm.

Furthermore, the present invention provides a polarizing plate that includes a) an optical film that is manufactured by using longitudinal and uniaxial stretching of an unstretched cycloolefin copolymer film and has an in-plane retardation of 100 to 150 nm and a thickness retardation of 0 to −30 nm at a wavelength of 550 nm, b) a first protection film that is disposed on the optical film, c) a polarizer that is disposed on the first protection film, and d) a second protection film that is disposed on the polarizer. The polarizing plate may further comprise a +C-plate on a lower surface of a) the optical film.

Furthermore, the present invention provides a polarizing plate that comprises a) an optical film that is manufactured by using longitudinal and uniaxial stretching of an unstretched cycloolefin copolymer film and has an in-plane retardation of 100 to 150 nm and a thickness retardation of 0 to −30 nm at a wavelength of 550 nm, b) a polarizer that is disposed on the optical film, and c) a protection film that is disposed on the polarizer. The polarizing plate may further comprise a +C-plate on a lower surface of a) the optical film.

Furthermore, the present invention provides a liquid crystal display that comprises an optical film that is manufactured by using longitudinal and uniaxial stretching of an unstretched cycloolefin copolymer film and has an in-plane retardation of 100 to 150 nm and a thickness retardation of 0 to −30 nm at a wavelength of 550 nm. It is preferable that the liquid crystal display be an in-plane switching (IPS) type.

Furthermore, the present invention provides a method of manufacturing an optical film. The method includes longitudinally and uniaxially stretching an unstretched film while a ratio of a width to a length of a stretched portion of the film is controlled.

Advantageous Effects

According to the present invention, an optical film for in-plane switching liquid crystal displays is manufactured, at low cost, by using an unstretched cycloolefin copolymer film that is easily purchased and low-priced is used to manufacture. Furthermore, a ratio of a width to a length of a stretched portion of the unstretched cycloolefin copolymer film is controlled during the stretching of the film to easily reduce a retardation variation and to manufacture an optical film having desired in-plane and thickness retardations.

BEST MODE FOR CARRYING OUT THE INVENTION

Hereinafter, the present invention will be described in detail.

An optical film according to the present invention is a film that has an in-plane retardation of 100 to 150 nm and a thickness retardation of 0 to −30 nm at a wavelength of 550 nm and is made of a cycloolefin copolymer. The optical film is manufactured by longitudinally and uniaxially stretching the unstretched cycloolefin copolymer film.

In the present invention, the in-plane retardation may be defined by the following Equation 1 and the thickness retardation may be defined by the following Equation 2.

$$R_{in}=d\times(Nx-Ny) \quad \text{[Equation 1]}$$

$$R_{th}=d\times\{(Nz-Ny)/2\} \quad \text{[Equation 2]}$$

In the above-mentioned Equations 1 and 2, Nx is an in-plane refractive index in a stretching direction, Ny is an in-plane refractive index in a direction that is perpendicular to the stretching direction, Nz is a thickness refractive index, and d is a thickness of a film.

The cycloolefin copolymer that is used in the optical film according to the present invention can be easily purchased and is low-priced. When the longitudinally and uniaxially stretched film is manufactured by using the cycloolefin copolymer, the cycloolefin copolymer has the in-plane and thickness retardations that are suitable to manufacture the optical film of the in-plane switching liquid crystal display, and the retardations are constant. Therefore, in the present invention, the optical film having abilities that are the same as or better than those of an optical film of a known in-plane switching liquid crystal display can be manufactured by using the cycloolefin copolymer at low cost.

A film is formed by using the cycloolefin copolymer and then uniformly, longitudinally, and uniaxially stretched to manufacture the optical film according to the present invention.

The cycloolefin copolymer is a polymer having a cyclic structure, and may be selected from the group consisting of a ring-opening polymer of a cyclic norbornene-based monomer and a hydrogen additive thereof; an addition polymer of a cyclic norbornene-based monomer and a hydrogen additive thereof; and an addition polymer of a cyclic norbornene-based monomer and a vinyl compound and a hydrogen additive thereof.

In the present invention, it is preferable to use a copolymer of the norbornene-based monomer and the ethylene monomer as the cycloolefin copolymer. Among the copolymers, a ratio of the norbornene-based monomer and the ethylene monomer is preferably 65 to 83:17 to 35 wt %.

The cycloolefin copolymer that is capable of being used in the present invention may include a repeating unit represented by the following Formula 1.

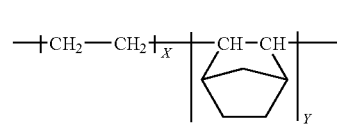

[Formula 1]

A commercially available copolymer of a norbornene-based monomer and a ethylene monomer may be used as the cycloolefin copolymer.

The cycloolefin copolymer, which has intrinsic physical properties of the norbornene resin such as heat resistance, low specific gravity, low birefringence, low specific elastic coefficient, and low wavelength dispersibility, frequently incurs retardation.

In the present invention, in order to improve heat resistance, UV resistance, flatness, and shapability of the optical film, antioxidants such as phenol and phosphorus series, degradation inhibitors such as phenol series, antistatic agents such as amine series, lubricants such as esters of aliphatic alcohols, polyhydric alcohols, higher fatty rids, and amides, and UV absorbing agents such as benzophenone and benzotriazole series may be added to the cycloolefin copolymer during the formation of the film by using the cycloolefin copolymer within the scope of the claims of the present invention.

A method of manufacturing the unstretched cycloolefin copolymer film is not limited, but may include a melt extrusion method, a calendar method, or a solution cast method. Among the methods, the melt extrusion method having excellent productivity is preferable. In the melt extrusion method, the cycloolefin copolymer is heated in a cylinder to be melted, pressed by using a screw, and discharged from a dye such as a T-dye.

The longitudinal and uniaxial stretching process according to the present invention may include a preheating step, a stretching step, and a heat treatment step, and the steps may be continuously performed. The longitudinal and uniaxial stretching process may be performed by using a device that is provided with a preheating zone, a stretching zone, and a heat treatment zone which are sequentially disposed.

In the preheating step, the film is preheated to be softened so that the unstretched film is desirably stretched during the stretching step after the preheating step.

In the preheating step, it is preferable that the unstretched film be heated at a temperature in the range of Tg−30° C. to Tg when a glass transition temperature of the unstretched film be Tg. It is preferable that the preheating time be in the range of 1 to 10 minutes to suppress unnecessary deformation. In the present invention, if the preheating time is in the range of 5 to 10 minutes, a variation of the retardation of the stretched film is small. Furthermore, the stretched film may have the retardation in the range that is suitable to manufacture the optical film of the in-plane switching liquid crystal display. In particular, if the unstretched film is desirably preheated during the preheating step, since the unstretched film is sufficiently softened, a variation of the retardation is small during the stretching. However, the preheating over a very long period of time undesirably increases the softening of the film. Thus, a high stretching ratio is required or it is difficult to obtain desirable birefringence.

During the stretching step that is performed after the preheating step, it is preferable that the unstretched film be stretched in a movement direction, that is, longitudinally and uniaxially stretched at a temperature in the range of Tg−20° C. to Tg+20° C. when a glass transition temperature of the unstretched film is Tg. In this connection, the stretching temperature, the stretching rate, and the stretching ratio depend on the type and the thickness of the unstretched film and the required in-plane retardation of the optical film. During the longitudinal and uniaxial stretching method, it is more preferable that the stretching temperature be in the range of Tg of the unstretched film to Tg+20° C. If the stretching temperature is less than Tg of the unstretched film−20° C., stress is concentrated during the stretching. Thus, the retardation variation of the stretched film is increased. If the stretching temperature is more than Tg of the unstretched film+20° C., it is difficult to obtain birefringence due to low molecular alignment.

During the stretching step, the stretching ratio depends on the thickness of the unstretched film and the retardation. However, it is preferable that the stretching ratio be 1.1 to 3. If the stretching ratio is lower than 1.1, it is difficult to form the film having the desirable retardation due to low birefringence. If the stretching ratio is higher than 3, a retardation variation of the stretched film is increased, causing an increase in neck-in.

In the present invention, it is preferable that the unstretched film be stretched at the stretching rate of 10 to 500%/minute.

In order to fix the alignment of the longitudinally and uniaxially stretched film during the heat treatment step that is performed after the preheating step and the stretching step, the heat treatment is performed so that a temperature of the unstretched film is in the range of Tg−50° C. to Tg−20° C. when the glass transition temperature of the unstretched film is Tg. During the heat treatment, cooling is performed at a temperature that is lower than that of the stretching step. Since heat is required even though the cooling is performed, the cooling step is called the heat treatment step. During the film processing, a final cooling zone is called a heat treatment zone.

If the optical film according to the present invention is formed by using the device that is provided with the preheating zone, the stretching zone, and the heat treatment zone, the unstretched film that moves through the preheating zone, the stretching zone, and the heat treatment zone is continuously heated, stretched, and heat treated for cooling. However, intermediate temperature area may be formed at the boundary between the zones. In order to prevent the intermediate temperature area from being formed, a narrow slit passage may be formed at the interface between the zones through which the film moves, but the present invention is not limited thereto. Furthermore, an adiabatic partition wall is provided at the interface to black heat, an air curtain is provided at the interface to black heat, or a combined process thereof is performed in order to maintain the temperatures of the zones.

Furthermore, the present inventors found that when a ratio of a width to a length of a stretched portion of the unstretched film is controlled while the unstretched film is longitudinally and uniaxially stretched during manufacturing of the optical film, in-plane and thickness retardation variations and in-plane and thickness retardations are controlled. Therefore, the present invention provides a method of manufacturing an optical film, which includes controlling a ratio of a width to a length of a stretched portion of an unstretched film during longitudinal and uniaxial stretching. The length relates to a stretching direction, that is, a longitudinal direction (L-MD).

Therefore, in the present invention, the ratio of the width to the length of the stretched portion of the unstretched film may be controlled to manufacture the optical film having uniform in-plane and thickness retardations and various thickness retardations in respects to the same in-plane retardation.

The ratio of the width to the length of the stretched portion of the unstretched film is less than 3, preferably 0.5 or more and less than 3, and more preferably 0.5 or more and 1.5 or less. If the ratio of the width to the length of the stretched portion of the unstretched film is 3 or more, the length of the stretched portion is smaller as compared to the width of the unstretched film. Thus, shrinkage in a width direction of the unstretched film is limited and simultaneous biaxial in-plane stretching waifs in the unstretched film. Accordingly, an alignment angle distribution of polymer chains is formed to reduce the thickness retardation. In addition, if the ratio of the width to the length of the stretched portion of the unstretched film is less than 0.5, the width of the stretched portion of the film is even smaller as compared to the length of the film. Thus, after the stretching the productivity may be reduced due to a very small effective width of the film.

In particular, when the ratio of the width to the length of the stretched portion of the unstretched film is controlled to be less than 3 and preferably 0.5 or more and less than 3 while the heat treatment is performed at a temperature of the glass transition temperature (Tg) of the unstretched film−20° C. or more, and preferably a temperature of the glass transition temperature (Tg) of the unstretched film or more during the stretching of the unstretched film, the molecular chains are aligned in a flow direction of the film due to the high flowability of the polymer chains and the stretched film has the high thickness retardation because the polymer chains are freely shrunken in a width direction.

In general, the stretching ratio may be controlled to adjust the thickness retardation. However, it is difficult to adjust the thickness retardation in the range of 0 to −30 nm, particularly, 0 to −15 nm. However, in the present invention, the ratio of the width to the length of the stretched portion of the unstretched film may be controlled in the above-mentioned range so that the thickness retardation of the stretched film is easily adjusted to be in the range of 0 to −30 nm and preferably 0 to −15 nm and the retardation variation of the entire film is reduced.

The thickness retardation comes near 0 due to free shrinkage in a width direction during the stretching as the ratio of the width to the length of the stretched portion of the unstretched film comes near the range of 0.5 to 1.5. In detail, since the thickness retardation represent the difference between a refractive index (Ny) in a direction that is perpendicular to the stretching direction and a refractive index (Nz) in a thickness direction, the thickness retardation comes near 0 as the two refractive indices become identical with each other. If there is the free shrinkage in a width direction, it is difficult to align the polymer chains in the Ny direction. Thus, Ny is reduced to reduce a difference between Ny and Nz. Furthermore, the entire surface of the film is uniformly stretched due to the free shrinkage in a width direction, thus significantly reducing retardation variation and thickness variation.

The optical film that is manufactured according to the method of the present invention has an in-plane retardation of 100 to 150 nm and a thickness retardation of 0 to −30 nm and preferably 0 to −15 nm at a wavelength of 550 nm. The optical film has a small retardation variation. The optical film has an in-plane retardation variation of preferably 30 nm or less and more preferably 15 nm or less. Under the above-mentioned condition, the optical film does not have a retardation stain. Furthermore, the thickness retardation variation is preferably 10 nm or less and more preferably 5 nm or less.

The optical film according to the present invention has the uniform retardation. The use of the optical film is not limited as long as the optical film has the uniform retardation. The optical film may be used as a retardation compensation film for in-plane switching liquid crystal displays.

In addition, the present invention provides a layered optical film that comprises a) a +C-plate, and b) an optical film that is disposed on the +C-plate, manufactured by using longitudinal and uniaxial stretching of an unstretched cycloolefin copolymer film, and has an in-plane retardation of 100 to 150 nm and a thickness retardation of 0 to −30 nm at a wavelength of 550 nm.

The +C-plate is a film having a in-plane retardation of almost 0 and a positive thickness retardation. The +C-plate has normal wavelength dispersion, flat wavelength dispersion, and reverse wavelength dispersion characteristics.

The +C-plate may be made of a polymer material or a UV-cured liquid crystal film. In detail, the +C-plate may be made of a homeotropically aligned liquid crystal film, a biaxially stretched PC (polycarbonate), or a biaxially stretched COP (cycloolefin polymer).

Furthermore, the present invention provides a polarizing plate that comprises a) an optical film that is manufactured by using longitudinal and uniaxial stretching of an unstretched cycloolefin copolymer film and has an in-plane retardation of 100 to 150 nm and a thickness retardation of 0 to −30 nm at a wavelength of 550 nm, b) a first protection film that is disposed on the optical film, c) a polarizer that is disposed on the first protection film, and d) a second protection film that is disposed on the polarizer. The polarizing plate may further include a +C-plate on a lower surface of a) the optical film.

A material that is known in the related art may be used to manufacture the polarizer. To be more specific, stretched PVA (stretched polyvinyl alcohol) may be used.

A protection film of a polarizing plate that is known in the related art may be used as the first protection film and the second protection film, but the present invention is not limited thereto. Specific examples of the protection film include films that are made of a polyester polymer such as polyethylene terephthalate and polyethylene phthalate; a cellulose polymer such as diacetyl cellulose and triacetyl cellulose; a acryl polymer such as polymethylmethacrylate; a styrene polymer such as polystyrene and acrylonitrile-styrene copolymer (AS resin); and a polycarbonate polymer. Furthermore, films that are made of a polyolefin polymer such as polynorbornene, vinyl chloride polymers, a amide polymer such as nylon and aromatic polyamide, a vinyl alcohol polymer, a vinylidene chloride polymer, a vinyl butyral polymer, a arylate polymer, a polyoxymethylene polymer, a epoxy polymer, and blend polymers thereof may be used. Furthermore, films that are made of thermosetting or UV-curing resins such as acryl, urethane, acryl urethane, epoxy, and silicon series may be used.

Furthermore, the present invention provides a polarizing plate that comprises a) an optical film that is manufactured by using longitudinal and uniaxial stretching of an unstretched cycloolefin copolymer film and has an in-plane retardation of 100 to 150 nm and a thickness retardation of 0 to −30 nm at a wavelength of 550 nm, b) a polarizer that is disposed on the optical film, and c) a protection film that is disposed on the polarizer. The polarizing plate may further include a +C-plate on a lower surface of a) the optical film.

Additionally, the present invention provides a liquid crystal display that comprises an optical film that is manufactured by using longitudinal and uniaxial stretching of an unstretched cycloolefin copolymer film and has an in-plane retardation of 100 to 150 nm and a thickness retardation of 0 to −30 nm at a wavelength of 550 nm. It is preferable that the liquid crystal display be an in-plane switching (IPS) type. The liquid crystal display according to the present invention may have a structure that is known in the related art, except that the liquid crystal display comprises the optical film of the present invention.

An embodiment of the present invention provides a liquid crystal display that includes a liquid crystal cell, a first polarizing plate and a second polarizing plate provided on both sides of the liquid crystal cell, and one or more optical films. The optical films are manufactured by longitudinally and uniaxially stretching an unstretched cycloolefin copolymer film between any one of the first polarizing plate and the second polarizing plate and the liquid crystal cell, and have an in-plane retardation of 100 to 150 nm and a thickness retardation of 0 to −30 nm at a wavelength of 550 nm. The +C-plate film may be further provided between the first polarizing plate or the second polarizing plate and the optical film, or between the liquid crystal cell and the optical film.

Another embodiment of the present invention provides a liquid crystal display that includes a liquid crystal cell, a first polarizing plate and a second polarizing plate provided on both sides of the liquid crystal cell, and an optical film used as a protection film. Any one of the first polarizing plate and the second polarizing plate has the optical film that is manufactured by longitudinally and uniaxially stretching an unstretched cycloolefin copolymer film and has an in-plane retardation of 100 to 150 nm and a thickness retardation of 0 to −30 nm at a wavelength of 550 nm at a side or both sides thereof. The +C-plate film may be further provided between the first polarizing plate or the second polarizing plate and the liquid crystal cell. Furthermore, an optical film that is manufactured by longitudinally and uniaxially stretching an unstretched cycloolefin copolymer film and has an in-plane retardation of 100 to 150 nm and a thickness retardation of 0 to −30 nm at a wavelength of 550 nm may be further provided between the first polarizing plate or the second polarizing plate and the liquid crystal cell.

In the present invention, the optical film, the +C-plate, the polarizer, the protection film, and the liquid crystal cell may be attached to each other by using an adhesive. However, the type of adhesive is not limited in the present invention.

MODE FOR THE INVENTION better understanding of the present invention may be obtained in light of the following Examples and Comparative Example which are set forth to illustrate, but are not to be construed to limit the present invention.

<Material>

In the present Example, the copolymer of a norbornene-based monomer and a ethylene monomer such as the Topas 6013 (Tg 138° C.) resin manufactured by Ticona, Co. was melt extruded by using the extruder having a screw L/D of 29, a T-Die width of 1200 mm, and a Lip of 1 mm to manufacture an unstretched film having a thickness of 100 μm.

The unstretched cycloolefin copolymer film was provided in a stretching machine that included a preheating zone, a stretching zone, and a heat treatment zone to be longitudinally and uniaxially stretched. The length of each of the zones was 1 m and a moving speed of the film was 0.4 m/minute.

Example 1

The unstretched cycloolefin copolymer film having a width of 650 mm was preheated in a preheating zone at a temperature of 125° C. The preheated unstretched film was longitudinally and uniaxially stretched in a stretching zone at a temperature of 140° C., a stretching rate of 40%/minute and a stretching ratio of 1.7. The stretched film, which passed through the stretching zone, was cooled in a heat treatment zone at 110° C. The resulting optical film had an average thickness of 80 μm, a width retardation variation of 5 nm, an in-plane retardation of 120 nm, and a thickness retardation of −15 nm.

Example 2

The unstretched cycloolefin copolymer film having a width of 650 mm was preheated in a preheating zone at a temperature of 120° C. The preheated unstretched film was longitudinally and uniaxially stretched in a stretching zone at a temperature of 145° C., a stretching rate of 40%/minute and a stretching ratio of 2. The stretched film, which passed through the stretching zone, was cooled in a heat treatment zone at 100° C. The resulting optical film had an average thickness of 75 μm, a width retardation variation of 7 nm, an in-plane retardation of 100 nm, and a thickness retardation of −15 nm.

<Measurement of Retardation>

The refractive index (n) of the optical film was measured by using an ABBE refractometer. In addition, the in-plane retardation (Re) was measured by using the axoscan manufactured by Axo-matrix, Co., and the angle between incident light and the film surface was measured to 50° at an interval of 10° to measure the retardations (Re).

When the refractive index in a stretching direction is Nx, the refractive index in a direction that is perpendicular to the stretching direction is Ny, and the refractive index in a thickness direction is Nz, the in-plane retardation Re=(Nx−Ny)×d and the thickness retardation Rth=(Nz−Ny)×d. In this connection, d denotes the thickness of the stretched film.

After the stretched film having the width of 550 to 600 mm was manufactured, an average value of the retardation variations measured at intervals of 100 mm in a width direction was obtained as the retardation variation of the entire surface of the stretched film.

Comparative Example

The optical film was manufactured by using the same procedure as Example 1, except that the longitudinal and uniaxial stretching was performed. Therefore, the unstretched film, which was manufactured by using the above-mentioned procedure, had the in-plane retardation of 3 nm and the thickness retardation of −4 nm.

Examples 3 To 8

The copolymer of a norbornene-based monomer and a ethylene monomer such as the Topas 6013 (Tg 138° C.) resin manufactured by Ticona, Co. was melt extruded by using the extruder having a screw L/D of 29, a T-Die width of 1200 mm, and a Lip of 1 mm to manufacture an unstretched film having a thickness of 100 μm. The unstretched film was stretched under the condition of the stretching ratio of 50%, the stretching temperature of 140° C., and the line speed of 0.4 m/minute. The ratio of the width to the length of the stretched portion of the film was controlled to be in the range of 0.5 to 3 during the stretching the width of the film was 500 mm, and the height of the roll was adjusted in a stretching area to perform longitudinal and uniaxial stretching thus manufacturing the optical film. The retardation and the retardation declination of the optical film are described in the following Table 1. After each of both transverse ends of the optical film was cut by 20 cm, $R_{in}$ and $R_{th}$ were measured at the center thereof. The variations of $R_{in}$ and $R_{th}$ mean a difference between the maximum retardation (Max.) and the minimum retardation (Mn.) of the film in a width direction.

TABLE 1

| Example No. | Ratio of a width to a length of a stretched portion of a film | $R_{in}$ [nm] | $R_{th}$ [nm] | $R_{in}$ variation [nm] | $R_{th}$ Variation [nm] |
|---|---|---|---|---|---|
| 3 | 0.5 | 130 | −1.3 | 5 | 3 |
| 4 | 1.0 | 129 | −5.7 | 8 | 6 |
| 5 | 1.5 | 127 | −10.2 | 10 | 10 |
| 6 | 2.0 | 123 | −17.6 | 15 | 23 |
| 7 | 2.5 | 119 | −27.8 | 28 | 25 |
| 8 | 3.0 | 114 | −43.1 | 40 | 30 |

The invention claimed is:

1. An optical film manufactured by a process comprising longitudinal and uniaxial stretching of an unstretched cycloolefin copolymer film while the ratio of a width to a length of a stretched portion of the film is controlled, wherein the optical film has an in-plane retardation of 100 to 150 nm and a thickness retardation of 0 to −30 nm at a wavelength of 550 nm and wherein the ratio of the width to the length of the stretched portion of the film is controlled to be less than 3.

2. The optical film according to claim 1, wherein the optical film is used to compensate a retardation of an in-plane switching (IPS) liquid crystal display.

3. The optical film according to claim 1, wherein the cycloolefin copolymer is a copolymer of a norbornene-based monomer and an ethylene monomer.

4. The optical film according to claim 3, wherein the norbornene-based monomer and the ethylene monomer are comprised at a weight ratio of 65 to 83:17 to 35.

5. The optical film according to claim 1, wherein the in-plane retardation variation is not greater than 30 nm, and the thickness retardation variation is not greater than 10 nm.

6. A layered optical film, comprising:
   a) a +C-plate; and
   b) an optical film that is disposed on the +C-plate, manufactured by using longitudinal and uniaxial stretching of an unstretched cycloolefin copolymer film while the ratio of a width to a length of a stretched portion of the film is controlled, and has an in-plane retardation of 100 to 150 nm and a thickness retardation of 0 to −30 nm at a wavelength of 550 nm, wherein the ratio of the width to the length of the stretched portion of the film is controlled to be less than 3.

7. A polarizing plate, comprising:
   a) the optical film of claim 1;
   b) a first protection film that is disposed on the optical film;
   c) a polarizer that is disposed on the first protection film; and
   d) a second protection film that is disposed on the polarizer.

8. The polarizing plate according to claim 7, further comprising a +C-plate on a lower surface of said a) the optical film.

9. A polarizing plate, comprising:
   a) the optical film of claim 1;
   b) a polarizer that is disposed on the optical film; and
   c) a protection film that is disposed on the polarizer.

10. The polarizing plate according to claim 9, further comprising a +C-plate on a lower surface of a) the optical film.

11. A liquid crystal display, comprising the optical film of claim 1.

12. The liquid crystal display according to claim 11, wherein the liquid crystal display is an in-plane switching (IPS) type.

13. A method of manufacturing an optical film, the method comprising:
longitudinally and uniaxially stretching an unstretched film while the ratio of a width to a length of a stretched portion of the film is controlled, and wherein the ratio of the width to the length of the stretched portion of the film is controlled to be less than 3.

14. The method of manufacturing an optical film according to claim 13, wherein the unstretched film is made of a cycloolefin copolymer.

15. The method of manufacturing an optical film according to claim 14, wherein the cycloolefin copolymer is a copolymer of a norbornene-based monomer and an ethylene monomer.

16. The method of manufacturing an optical film according to claim 15, wherein the norbornene-based monomer and the ethylene monomer are comprised at a weight ratio of 65 to 83:17 to 35.

17. The method of manufacturing an optical film according to claim 13, wherein the optical film has an in-plane retardation of 100 to 150 nm and a thickness retardation of 0 to −30 nm at a wavelength of 550 nm.

18. The method of manufacturing an optical film according to claim 13, wherein an in-plane retardation variation is not greater than 30 nm and a thickness retardation variation is not greater than 10 nm.

19. The method of manufacturing an optical film according to claim 13, wherein the optical film is used to compensate a retardation of an in-plane switching (IPS) liquid crystal display.

* * * * *